INVENTORS
JOSEPH R. WOOLSLAYER
CECIL JENKINS
BY Brown, Critchlow,
Flick & Peckham
THEIR ATTORNEYS

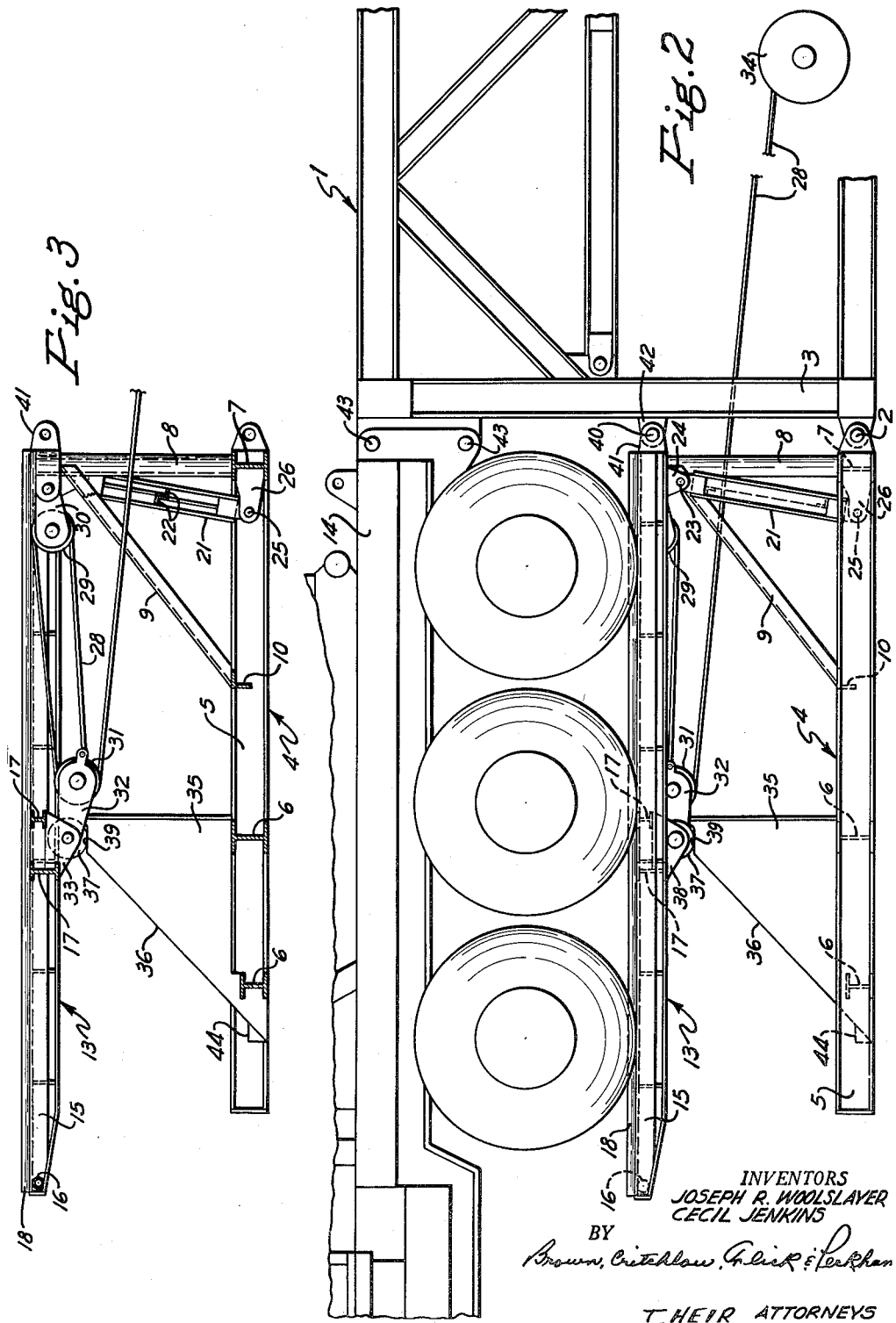

March 27, 1962    J. R. WOOLSLAYER ET AL    3,026,970
ELEVATING RAMP STRUCTURE FOR VEHICLES
Filed May 10, 1960      3 Sheets-Sheet 3

INVENTORS
JOSEPH R. WOOLSLAYER
CECIL JENKINS
BY
THEIR ATTORNEYS

United States Patent Office 3,026,970
Patented Mar. 27, 1962

3,026,970
ELEVATING RAMP STRUCTURE FOR VEHICLES
Joseph R. Woolslayer and Cecil Jenkins, Tulsa, Okla., assignors to Lee C. Moore Corporation, a corporation of Pennsylvania
Filed May 10, 1960, Ser. No. 28,153
3 Claims. (Cl. 187—8.72)

This invention relates to vehicle ramps, and more particularly to those used with the substructures of oil well drilling masts.

In oil fields it is becoming more and more the practice to permanently mount the drawworks and their driving engines on trailers hauled by trucks, in view of which the mast substructures are formed for receiving the trailers so that the drawworks can be located properly relative to the substructures. In some cases the masts are also carried by the trailers. When a substructure is relatively low, all that needs to be done is to back the trailer up against it and fasten it in place. However, substructures often are many feet high, so that the trailer has to be elevated several feet in order to support the drawworks at the proper level. One way of doing this is to back the trailer up a ramp, but with high substructures the ramp may have to be as much as 40 feet long in order to raise the trailer five or six feet without the grade being too steep. Such ramps are not only heavy and expensive, but they are cumbersome to haul from one well location to another. This can be a major problem where a drilling rig may have to be moved several times in a short period of time.

It is among the objects of this invention to provide a vehicle ramp structure which is inclined at a moderate angle, which is quite short and compact, which can raise a vehicle into a horizontal position several feet above the upper end of the inclined ramp, and which involves lifting forces that are within practical limitations.

In accordance with this invention, a ramp has an elevated front end that is supported above a base by a supporting member that extends forward and downward from the ramp to the base. The supporting member is pivotally connected to the front of the ramp and the base on axes transverse to the ramp. Provision is made for moving the ramp forward a predetermined distance, thereby causing its supporting member to raise its front end to a higher level. Inclined upwardly and forwardly behind the supporting member are track means. Roller means are attached to the ramp in engagement with the track means and are adapted to move up the track when the ramp is moved forward. The inclination of the track means is steep enough for the roller means to raise the rear end of the ramp to the previously mentioned higher level. At the top of the track means there is a forwardly extending area for receiving and supporting the roller means while the ramp is in its forward position.

The preferred embodiment of the invention is illustrated in the accompanying drawings, in which FIG. 1 is a side view of my ramp structure connected to a simplified oil well mast substructure;

FIG. 2 is a similar view, with the ramp itself raised to a horizontal position and attached to the substructure;

FIG. 3 is a central longitudinal section through the raised ramp structure;

Figure 1:
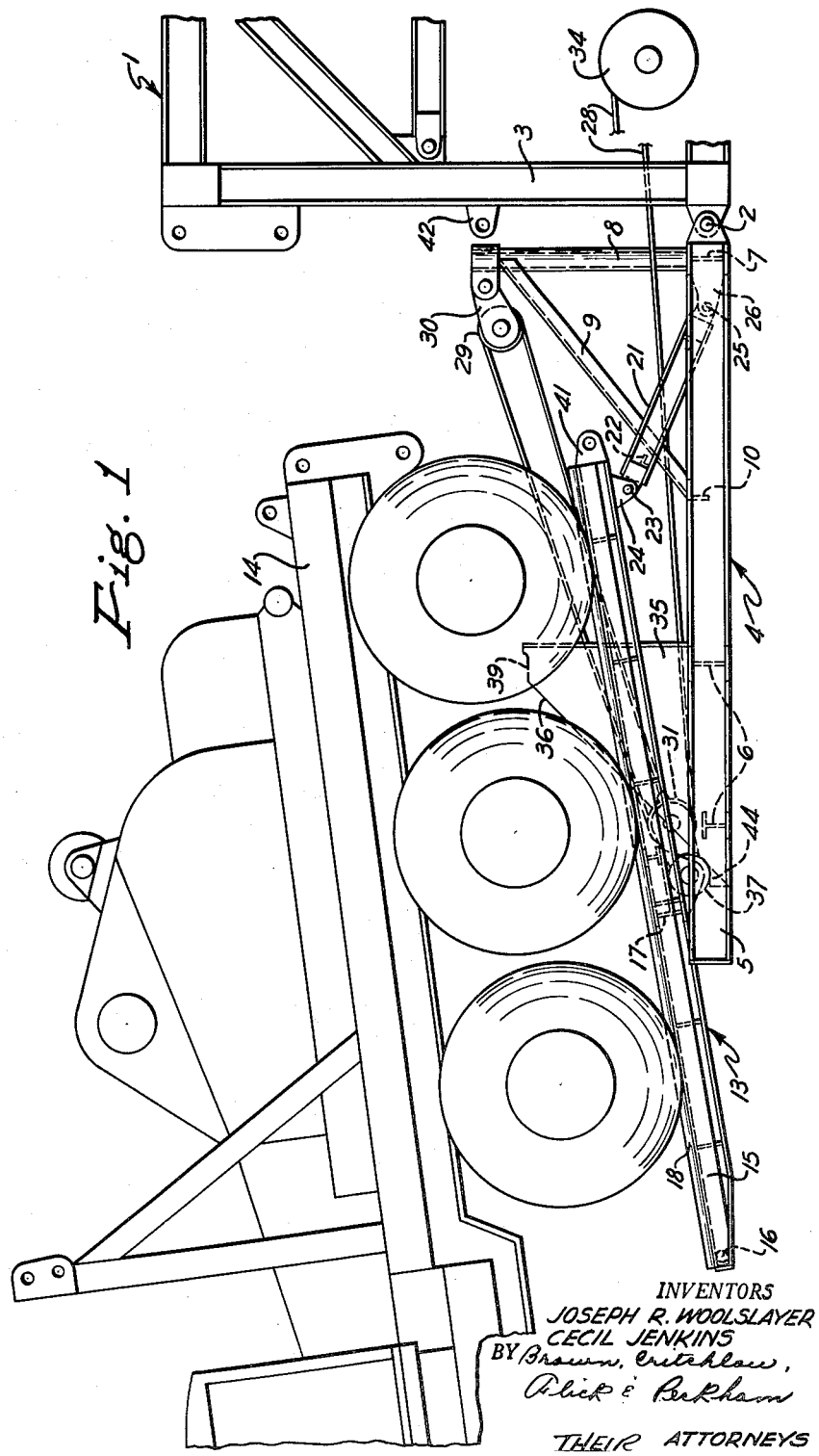
Figure 5:
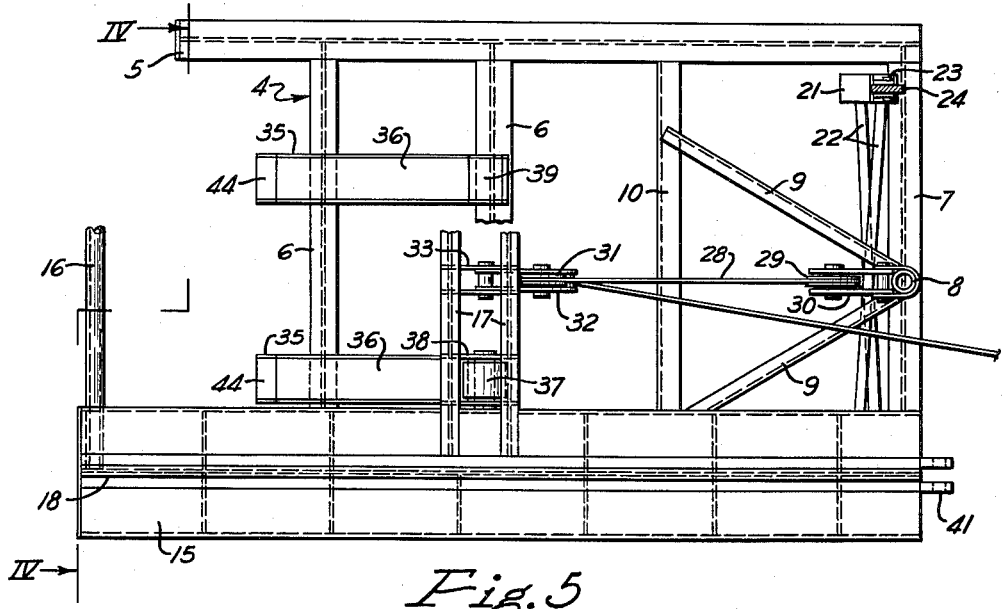
FIG. 5 is a combined plan view and horizontal section taken on the line V—V of FIG. 4.
Figure 4:
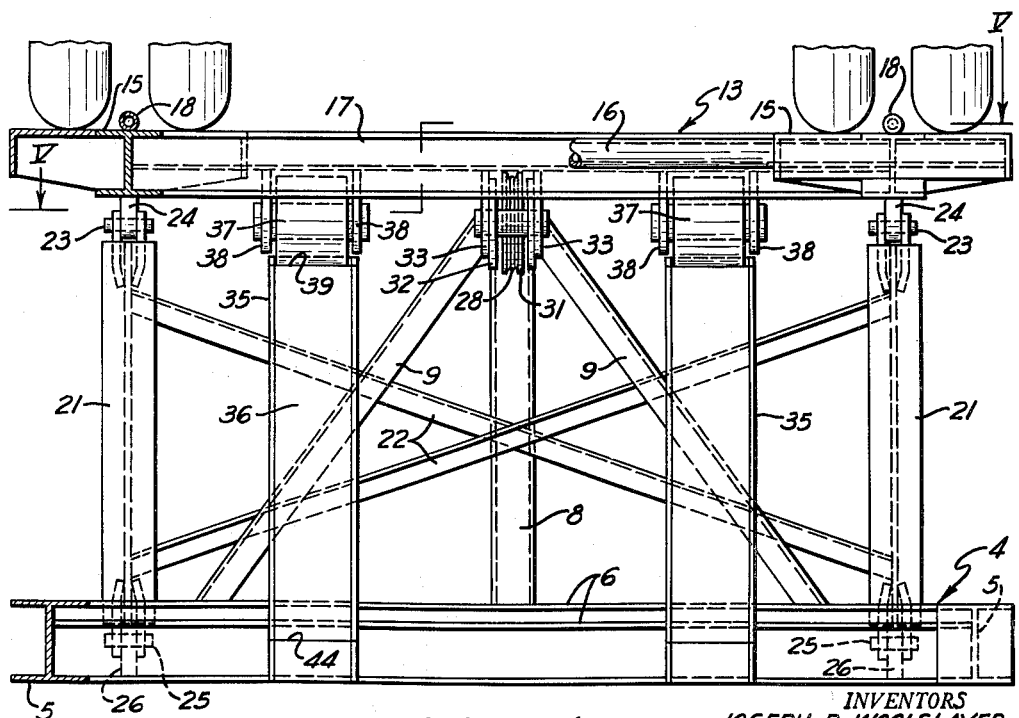
FIG. 4 is a combined transverse section and rear end view of the ramp structure.

Referring to the drawings, a simplified substructure 1 for an oil well drilling mast is shown, but the invention is equally applicable to more complex substructures provided with bays for receiving trailer-mounted drawworks. The substructure is tall, being at least six feet high. Detachably connected by removable pins 2 to the lower ends of the back legs 3 of the substructure is the front end of a ramp structure base 4. The base is formed from parallel side beams 5 rigidly connected by cross beams 6 and 7. At the front end of the base there is an upright member or post 8 rigidly mounted on the front cross beam 7. The post is braced by a pair of inclined braces 9 extending rearwardly and downwardly from it. The rear ends of the braces are secured to a cross member 10 near its ends, which are connected to the side beams of the base several feet behind their front ends.

Above the base there is a ramp 13 that is gently sloped forward and upward and up which a truck trailer 14 can be backed without any difficulty, as shown in FIG. 1. The ramp is formed from a pair of flat tracks 15 rigidly connected at their rear ends and central portion by cross braces 16 and 17. Extending along the center of each track there may be a pipe 18 that can be straddled by the dual tires of the trailer to help guide its wheels as it moves up and down the ramp.

The front end of the ramp is supported in its elevated position by means of a supporting member located between it and the base. The supporting member is formed from a pair of links 21 rigidly connected by crossed braces 22. The upper ends of the links are pivotally connected by pins 23 to brackets 24 projecting down from the bottom of the ramp tracks at the front of the ramp. The lower ends of the links are likewise connected by pins 25 to brackets 26 secured to the back of the front cross beam of the base. The upper and lower pivot pins are parallel to each other, with their axes extending transversely of the ramp and base. The braces 22 are connected to links 21 near their ends and pass below post braces 9, which are disposed at such angles that they will not interfere with the movements of the crossed braces when the links are swung up and down as now will be described.

When the ramp is in the inclined position shown in FIG. 1, its lower end rests on the ground, and the pivoted supporting member extends forward and downward from the ramp to the base. It will be seen that if the ramp is moved forward, links 21 will have to swing upward and that will raise the front end of the ramp to a higher level. Forward movement of the ramp may be accomplished by means of a line 28 that is reeved around sheaves connected with post 8 and the ramp. Thus, the front sheave 29 forms part of a snatch block 30 that is mounted on the post. The rear sheave 31 also forms part of a snatch block 32 that is pivotally connected to parallel brackets 33 secured at their front and rear ends to the two central cross braces 17 of the ramp. The line 28 may have one end anchored to the rear snatch block and then extend forward and upward between the ramp tracks and up around the front sheave, back and down around the rear sheave and then forward away from the base and through the substructure to a suitable power supply, such as a winch 34 on a truck. When the line is wound on a winch, it will pull the rear sheave 31 forward and thereby pull the ramp forward. Since both sheaves are mounted in the ramp structure, it is not necessary to go to the trouble of attaching the front sheave to the substructure every time the ramp structure is placed in operative position.

It is a feature of this invention that as the ramp is pulled forward to raise its front end, its rear end rises faster and reaches the same level as the front end so that the ramp will be horizontal in its upper position, as shown in FIGS. 2 and 3. Accordingly, track means are mounted on the base near its rear end and may consist of a pair of laterally spaced track members 35 rigidly mounted on the rear cross beams 6 of the base. Each track member has a forwardly and upwardly inclined track 36, on which travels a roller 37 that is journaled in brackets 38 projecting downward from the central cross braces 17 of the ramp. It will be seen that with this construction the rollers will roll up the tracks when the ramp is pulled forward by line 28. The tracks are made steep enough for the rollers to raise the rear end of the ramp to the same elevation as the front end. At the top of the track members, they have forwardly extending areas 39, preferably horizontal, for receiving the rollers just before the forward movement of the ramp stops and for supporting them after the ramp comes to rest in its upper position. As shown in FIG. 2, the ramp is held in that position by pins 40 that detachably connect forks 41 at its front end to lugs 42 projecting from the back side of the rear legs 3 of the substructure.

To eliminate any possibility of the ramp accidentally moving backward and descending when the pins 40 are removed, it is preferred that the links lean forward toward the substructure when the ramp is in its upper position. The weight on the horizontal ramp will therefore urge it forward toward the substructure. This also facilitates pinning the ramp to the substructure when the ramp is raised. After the ramp has been raised, the trailer 14 that is raised with it is connected to the back of the substructure too, such as by pins 43 shown in FIG. 2. The trailer will thus be supported horizontally at the desired height, even though the ramp 13 is a great deal shorter than would be the case if it had been inclined from the ground to its elevated position at a grade no steeper than this ramp occupies in its lower position. Also, the power required to lift the ramp from its inclined position to its upper horizontal position is much less than would be necessary if the ramp were horizontal in its lower position also.

When it is desired to move the trailer to another location, the ramp and trailer are disconnected from the substructure and the ramp is pulled backward away from the substructure far enough for rollers 37 to roll off the horizontal tops 39 of track members 35 and into engagement with the upper ends of the inclined tracks 36. As the supporting links 21 will then no longer be leaning forward, the weight of the trailer and its load will cause the rollers to roll down the inclined tracks until the rear end of the ramp reaches the ground and the rollers reach horizontal stops 44 projecting from the lower ends of the inclined tracks. The downward movement of the ramp can be controlled by winch 34, which snubs it. After the trailer has been hauled away from the ramp, base 4 can be disconnected from the substructure so that the ramp structure can be transported to another location.

The links 21 hold the ramp and base together, especially during transportation from one location to another. On the other hand, the use of inclined tracks 36 instead of a second pair of links near the rear end of the base materially reduces the line pull that is necessary for raising the ramp, because a rear set of links would have to lie quite flat in the down position and therefore would require an initial line pull that is too high for practical purposes. The front links do not have that objection, because they are inclined to a material extent and therefore have good lifting characteristics. With the construction disclosed herein, the estimated initial line load for a 60,000 pound trailer load is only 18,400 pounds, and the line load decreases as the ramp rises so that the average line load is about 14,000 pounds.

According to the provisions of the patent statutes, we have explained that principle of our invention and have illustrated and described what we now consider to represent its best embodiment. However, we desire to have it understood that, within the scope of the appended claims, the invention may be practiced otherwise than as specifically illustrated and described.

We claim:

1. A vehicle ramp structure comprising a base, a ramp having an elevated front end above the base, a ramp supporting member extending forward and downward from the ramp to the base, means pivoting said member to the front of the ramp and the base on axes transverse to the ramp, means for moving the ramp forward a predetermined distance to cause said pivoted supporting member to raise the front end of the ramp to a higher level, track means inclined upwardly and forwardly from said base behind said supporting member, and roller means attached to the ramp in engagement with said track means and adapted to roll up the track means when the ramp is moved forward, the inclined track means being steep enough for said roller means to raise the rear end of the ramp to said higher level, and said track means having at the top a forwardly extending area for receiving and supporting said roller means while the ramp is in its forward position.

2. A vehicle ramp structure comprising a base, a post rigidly mounted at the center of the front end of the base, a ramp behind the post having an elevated front end above the base, a pair of laterally spaced links extending forward and downward from the ramp to the base, means pivoting the links to the front of the ramp and the base on axes transverse to the ramp, inclined braces extending from the upper part of the post outward and down between said links to the base, crossed braces connected to the opposite ends of the links beneath said inclined braces, a sheave connected with the top of said post, a sheave connected with the central portion of the ramp, a line reeved around said sheaves and having one end anchored and the other end extending past the post and adapted to be pulled for pulling the ramp forward a predetermined distance to cause the links to raise the front end of the ramp to a higher level, track means inclined upwardly and forwardly from said base behind the post, and roller means attached to the ramp in engagement with said track means and adapted to roll up the track means when the ramp is pulled forward, the inclined track means being steep enough for said roller means to raise the rear end of the ramp to said higher level, and said track means having at the top a forwardly extending area for receiving and supporting said roller means while the ramp is in its forward position.

3. In oil well drilling apparatus, a mast substructure, a base member behind the substructure, a rigid upright member mounted on the front end of the base, means detachably connecting the front end of the base to the back of the substructure, a ramp behind said upright member having an elevated front end above the base, a ramp-supporting member extending forward and downward from the ramp to the base, means pivoting said member to the front of the ramp and the base on axes transverse to the ramp, means connected with said upright member and ramp for pulling the ramp forward a predetermined distance to cause said pivoted supporting member to raise the front end of the ramp to a higher level and lean forward, track means inclined upwardly and forwardly from said base behind said supporting member, roller means attached to the ramp in engagement with said track means and adapted to roll up the track means when the ramp is pulled forward, the inclined track means being steep enough for said roller means to raise the rear end of the ramp to said higher level, said track means having at the top a forwardly extending area for receiving and supporting said roller means while the ramp is in its forward position, and means for detachably connecting the front end of the ramp to the back of said substructure when the ramp is in said forward position.

References Cited in the file of this patent

UNITED STATES PATENTS

| | | |
|---|---|---|
| 1,286,861 | Willer | Dec. 3, 1918 |
| 1,527,136 | Hertner | Feb. 17, 1925 |
| 1,806,323 | Weaver et al. | May 19, 1931 |
| 2,901,216 | Bender | Aug. 25, 1959 |

FOREIGN PATENTS

| | | |
|---|---|---|
| 131,194 | Australia | Jan. 28, 1949 |